United States Patent
Comfort et al.

(10) Patent No.: US 9,248,725 B2
(45) Date of Patent: *Feb. 2, 2016

(54) PANORAMIC ROOF MODULE FOR A VEHICLE

(75) Inventors: Jeffrey Comfort, Saline, MI (US);
Bryan Underwood, Livonia, MI (US);
Artem Poliakov, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 159 days.

This patent is subject to a terminal disclaimer.

(21) Appl. No.: 13/439,667

(22) Filed: Apr. 4, 2012

(65) Prior Publication Data

US 2013/0268163 A1    Oct. 10, 2013

(51) Int. Cl.
*B60J 7/043* (2006.01)
*G06F 7/00* (2006.01)
*B60J 7/04* (2006.01)

(52) U.S. Cl.
CPC ........................................ *B60J 7/04* (2013.01)

(58) Field of Classification Search
CPC ............... B60J 7/04; B60J 7/043; B60J 7/165
USPC ..................................................... 296/216.04
See application file for complete search history.

(56) References Cited

U.S. PATENT DOCUMENTS

| | | |
|---|---|---|
| 5,029,937 A | 7/1991 | Yamamoto |
| 5,100,197 A | 3/1992 | Ichinose et al. |
| 5,104,178 A | 4/1992 | Bienert |
| 5,466,038 A | 11/1995 | Fujie et al. |
| 5,540,478 A | 7/1996 | Schuch |
| 6,129,413 A | 10/2000 | Klein |
| 6,443,520 B1 | 9/2002 | Schmaelzle et al. |
| 6,460,920 B1 | 10/2002 | Reinsch |
| 6,513,865 B1 | 2/2003 | Lutz et al. |
| 6,619,732 B2 | 9/2003 | Radmanic |
| 6,644,728 B1 | 11/2003 | Nagashima et al. |
| 6,817,658 B2 | 11/2004 | Ohnishi et al. |
| 6,942,286 B2 | 9/2005 | Bohm et al. |
| 7,073,851 B2 | 7/2006 | Seifert |
| 7,077,462 B1 | 7/2006 | De Gaillard |

(Continued)

FOREIGN PATENT DOCUMENTS

| | | | |
|---|---|---|---|
| GB | 2 428 652 A | 2/2007 | |
| JP | 2003312253 A | * 11/2003 | ................ B60J 1/17 |

OTHER PUBLICATIONS

Machine translation of Tanioku JP 2003-312253 (printed on Jan. 28, 2014).*

(Continued)

*Primary Examiner* — John Q Nguyen
*Assistant Examiner* — Alan D Hutchinson
(74) *Attorney, Agent, or Firm* — Damian Porcari (57) ABSTRACT

A panoramic vehicle sunroof system is provided. The panoramic sunroof system has a movable roof panel operable to define a sunroof opening extending generally from a front pillar to a rear pillar. A sunroof controller is configured to receive input indicative of vehicle speed and automatically control movement of the panel. The sunroof controller commands movement of the roof panel from a first open position to a second open position having an opening distance less than in the first position when speed exceeds a threshold. In the second position, wind noise is reduced.

20 Claims, 6 Drawing Sheets

(56) References Cited

U.S. PATENT DOCUMENTS

| | | | |
|---|---|---|---|
| 7,183,733 B2 | 2/2007 | Suzuki et al. | |
| 7,243,989 B2 | 7/2007 | Manders | |
| 7,367,609 B2 | 5/2008 | Grudzinski et al. | |
| 7,425,033 B2 | 9/2008 | Regnier et al. | |
| 7,625,040 B2 | 12/2009 | Pollak et al. | |
| 7,780,228 B2 | 8/2010 | Rashidy et al. | |
| 7,828,373 B2 | 11/2010 | Fernholz et al. | |
| 7,877,180 B2 | 1/2011 | Turner et al. | |
| 7,922,242 B2 | 4/2011 | Comfort et al. | |
| 7,974,755 B2 | 7/2011 | Campbell et al. | |
| 2003/0015891 A1 | 1/2003 | Doll et al. | |
| 2004/0104604 A1* | 6/2004 | Doncov et al. | 296/216.04 |
| 2005/0269841 A1* | 12/2005 | Raasakka et al. | 296/217 |
| 2006/0108838 A1 | 5/2006 | Diez et al. | |
| 2009/0033128 A1 | 2/2009 | Hoetzel | |
| 2009/0088065 A1 | 4/2009 | Mouch et al. | |
| 2010/0032993 A1* | 2/2010 | Yoshida et al. | 296/223 |
| 2010/0038933 A1* | 2/2010 | Comfort et al. | 296/216.08 |
| 2011/0029196 A1* | 2/2011 | Escott | 701/36 |

OTHER PUBLICATIONS http://www.caranddriver.com/reviews/porsche-911-targa-first-drive-review, Feb. 2002, Barry Winfield, pp. 1-3.

http://www.chicagonow.com/drive-she-said/2010/10/todays-rave-vw-touareg-panoramic-sunroof, Oct. 27, 2010, Jill Ciminillo, pp. 1-5.

European Search Report for corresponding Appn. No. EP 2 154 015 A1, mailed Dec. 1, 2009, 6 pgs.

Office Action mailed Sep. 23, 2010 in corresponding U.S. Appl. No. 12/482,526, filed Jun. 11, 2009, 6 pgs.

Office Action mailed Dec. 22, 2009 in corresponding U.S. Appl. No. 12/192,300, filed Aug. 15, 2008, 11 pgs.

Office Action mailed May 12, 2010 in corresponding U.S. Appl. No. 12/192,300, filed Aug. 15, 2008, 8 pgs.

Final Office Action dated Feb. 20, 2015 for U.S. Appl. No. 13/762,665.

\* cited by examiner

PANORAMIC ROOF MODULE FOR A VEHICLE

TECHNICAL FIELD

Various embodiments relate to panoramic roof module assemblies for a vehicle.

BACKGROUND

Vehicle roof assemblies are typically mounted on vehicle bodies to enclose interiors of the vehicles. Various types of roof assemblies have been employed. Some roof assemblies include sunroofs which include may be transparent and/or open to allow occupants to look out the roof the vehicle. Typically, sunroofs only cover a portion of the roof assembly. However, panoramic sunroofs, like those described in U.S. Pat. No. 7,922,242 or 7,828,373 may cover substantially the entire roof to allow passengers to look out almost the entire roof of the vehicle as well as adding aesthetic styling to the vehicle.

SUMMARY

In one embodiment, a panoramic vehicle sunroof system is provided. The panoramic sunroof system has a movable roof panel operable to define a sunroof opening extending generally from a front pillar to a rear pillar. A sunroof controller is configured to receive input indicative of vehicle speed and automatically control movement of the panel. The sunroof controller commands movement of the roof panel from a first open position to a second open position having an opening distance less than in the first position when speed exceeds a threshold. In the second position, wind noise is reduced.

In another embodiment, the panoramic sunroof system includes a vehicle network in communication with a vehicle sensor and sunroof controller wherein the communication network continuously provides a speed signal to the sunroof controller.

In another embodiment, the vehicle network includes a CAN bus.

In another embodiment, the sunroof system includes a wind deflector. The sunroof panel does not extend above the wind deflector with the sunroof panel is in one of the first and second open positions.

In another embodiment, the threshold value is based on the vehicle speed that produces buffeting in a passenger compartment at a critical noise level.

In another embodiment, the panoramic sunroof system includes a sunroof actuator in communication with the controller for moving the roof panel between the first panoramic position and the second position.

In another embodiment, the actuator is adapted to determine the position of the roof panel.

In one other embodiment sunroof system for a vehicle is provided. The sunroof system includes a sunroof panel and a sunroof controller. The sunroof controller is configured to control movement of the sunroof panel from a first panoramic open position to a second open position when a relative wind speed exceeds a threshold value.

In another embodiment, the sunroof panel extends from a front pillar to a rear pillar of the a four-door vehicle when the sunroof panel is in a closed position.

In another embodiment, the second position has an opening distance less than in the panoramic position.

In another embodiment, the panoramic sunroof system includes at least one vehicle sensor in communication with the controller for providing a vehicle speed signal to the controller.

In another embodiment, the panoramic sunroof system includes a vehicle communication network having a CAN bus for providing the vehicle speed signal to the controller.

In another embodiment, the relative wind speed is based on a vehicle speed.

In another embodiment, the threshold value is based on the relative wind speed that produces buffeting in the passenger compartment at a critical noise level.

In another embodiment, the second position has an opening distance of at least 430 millimeters.

In another embodiment, in the first panoramic position, the sunroof panel overlaps a driver's field of vision through a rear-view window.

In another embodiment, the panoramic sunroof includes a sunroof panel actuator in communication with the controller for moving the panel between the panoramic position and the second position.

In another embodiment, the actuator is adapted to determine a position of the panel.

In one other embodiment, a method for controlling a panoramic sunroof system is provided. The method adjusts a roof panel from a panoramic open position to a second open position if a relative wind speed exceeds a threshold value.

In another embodiment, the method includes receiving a wind speed signal from a CAN bus. A sunroof actuator commands the roof panel to the second position based on the wind speed signal.

In another embodiment, the method includes basing the relative wind speed on a vehicle speed.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
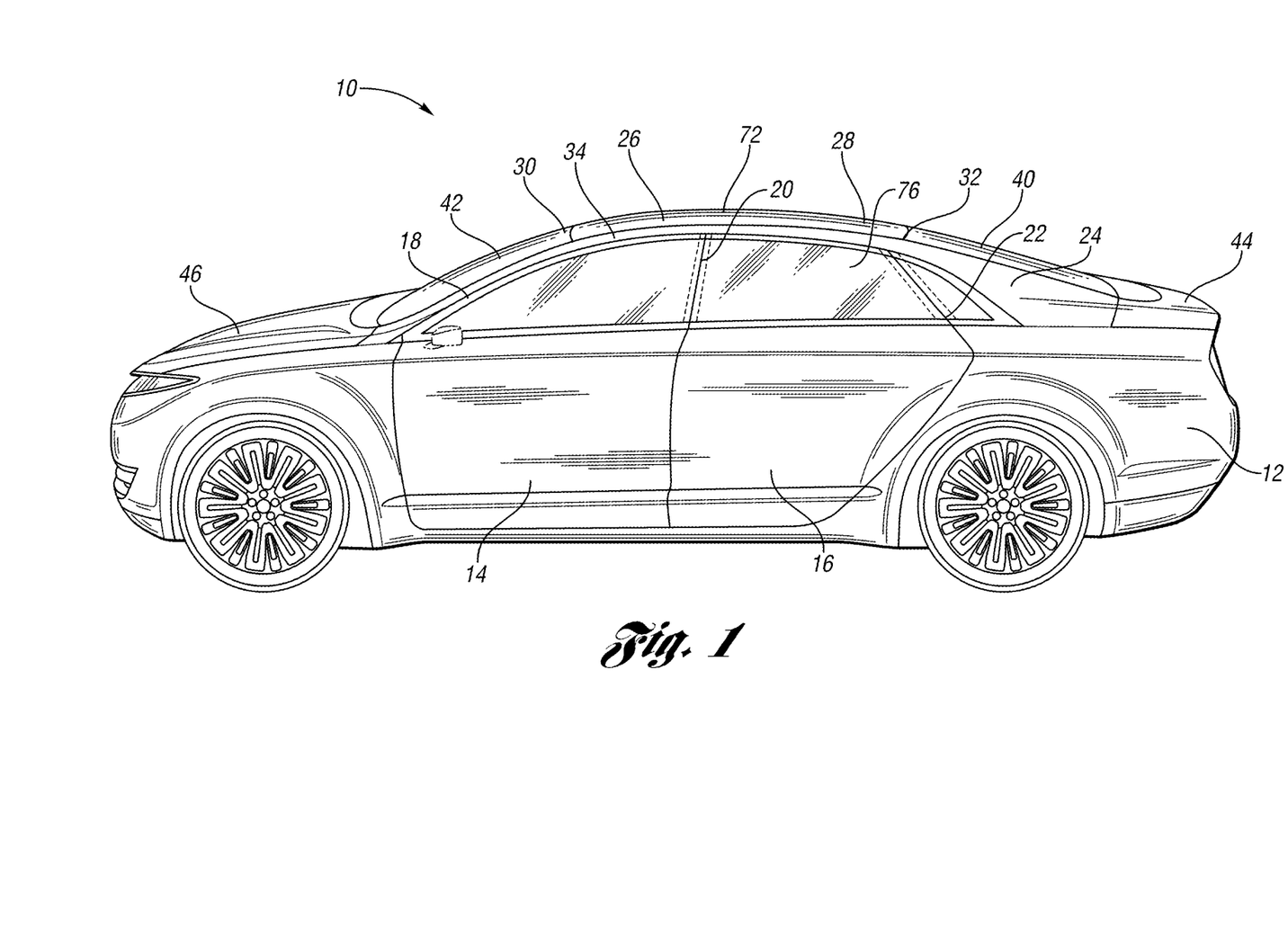
FIG. 1 is a side perspective view of a vehicle having a panoramic roof module assembly according to an embodiment.

Referring to FIGS. 1 through 5, a four-door passenger vehicle is illustrated and referenced generally by numeral 10. The passenger vehicle 10 has a vehicle body 12, which provides a body structure for the vehicle 10. As illustrated in FIG. 1, the vehicle body structure 12 is for a sedan having four doors including front doors 14 and rear doors 16. The body structure 12 generally defines an opening for the front doors 14 between an A-pillar 18 and a B-pillar 20. Likewise, the body structure 12 generally defines the rear doors 16 between the B-pillar 20 and a C-pillar 22. As in the embodiment illustrated in FIG. 1, the B-pillar may be located inboard of the front doors 14 and rear doors 16 so that the B-pillar is not visible from the exterior of the vehicle 10. The body structure 12 may also include a D-pillar 24 rearward of the C-Pillar 22.

As shown in FIG. 1, the vehicle body structure 12 further defines an opening for a roof 26. As further illustrated in FIG. 1, the roof 26 may be a panoramic roof module assembly 28 such that the roof 26 is formed of transparent material, such as glass or polycarbonate, and collectively forms the entire roof 26.

The body structure 12 includes a front cross member 30 which generally extends between the A-pillars 18 on the lateral sides of the vehicle 10. The body structure 12 also includes a rear cross member 32 which generally extends between the C-pillars 22 and/or D-pillars 24 on the lateral sides of the vehicle 10. The panoramic roof module 28 extends longitudinally between the front cross member 30 and the rear cross member 32. The front and rear cross members 30, 32, in addition to providing torsional support to the vehicle 10 may also provide support for the panoramic roof module 28.

The body structure 12 further includes side beam portions 34 which generally extend longitudinally from the A-pillars 18 to the C-pillars 22 along the lateral sides of the vehicle 10. The side beam portions 34 may be formed integrally with the A-pillar 18 and/or C-pillar 22, or may be formed as a separate structure extending there between. The panoramic roof module 28 extends laterally between the side beam portions 34.

In the illustrated embodiment, the panoramic roof module assembly 28 allows an occupant to look through the entire roof 26 from an interior of the vehicle 10 for the majority of the panoramic roof 26 so that the panoramic opening is unimpeded by structural members, such as an intermediate cross member between the B-pillars. Typically, four door vehicles require intermediate cross members maintain the structural integrity of the vehicle along the lateral length spanning front and rear doors. The body structure 12 provides structural support against dynamic vehicle forces while still allowing for a moveable panoramic roof panel 26.

A rear-view window 40 is defined laterally between the D-pillars 24. The rear-view window slopes downward from the rear cross member 32 to a rear structure of the vehicle such as the trunk compartment 44. Similarly, a front windshield 42 is defined laterally between the A-pillars 18. The windshield 42 slopes downward from the front cross member 30 to a front structure of the vehicle such as an engine compartment or a hood 46.

Figure 2:
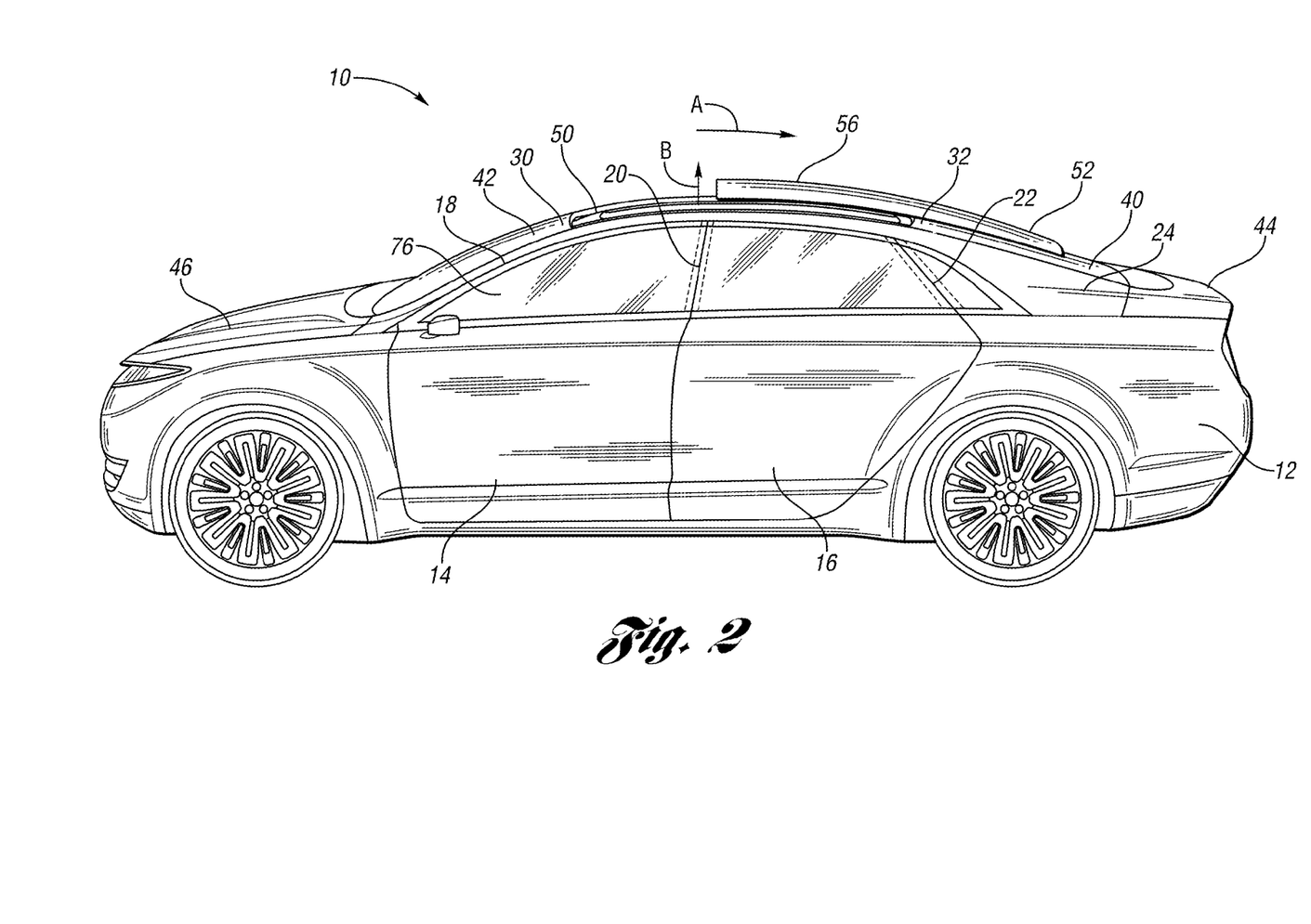
FIG. 2 is another side perspective view of a vehicle wherein the panoramic roof module is illustrated in a plurality of open positions.

As illustrated in FIG. 2, the panoramic roof module 28 is operable so that the roof 26 can be opened to reveal a roof opening 50. The roof 26 may be moved to a plurality of positions corresponding to different sized roof openings 50. In the fully opened position, illustrated by reference numeral 52, the roof 26 is moved so that the roof 26 over laps the rear-view window 40.

In the illustrated embodiment in FIG. 2, in the fully open position 52, the roof 26 overlaps at least 80% of the rear-view window 40. When the roof 26 overlaps the rear-view window 40, the driver or other occupants can look out the rear over vehicle through both the roof 26 and the rear-view window 40 simultaneously.

In the fully open position 52, a panoramic roof opening extends generally from the front cross member 30 to the rear cross member 32. The panoramic roof opening extends substantially past the B-pillar 20 so that occupants including passengers in the back seat can look through the panoramic roof opening 54. The panoramic roof opening is unimpeded by any vehicle structures, such as intermediate cross members between the B-pillars, as in prior art designs. The panoramic opening may have an opening distance of more than 600 millimeters open in the longitudinal direction. In another embodiment, the panoramic opening distance may be from 500 to 550 millimeters.

The panoramic roof module 28 may also move the roof 26 to a second position, illustrated by reference numeral 56. The second position 56 has an opening distance less than the panoramic opening distance. In one embodiment, the second position 56 has an opening distance of 400 to 450 millimeters. In another embodiment, the second position 56 has an opening distance generally 100 millimeters less than the panoramic position 52. Alternatively, the second position 56 may have an opening distance of 430 millimeters.

The roof 26 may be formed with an arc. The roof may be formed with an arc that is substantially similar to the arc of the rear-view window 40. In the fully open position 52, the roof panel 26 may be positioned at an offset distance substantially parallel to the rear window 40. As discussed previously, in at least one embodiment, the roof panel 26 is formed of a polycarbonate material that is transparent. By employing a polycarbonate material for the roof panel 26 the weight for the roof module 28 is reduced when compared to roof assemblies utilizing glass. Additionally, utilization of polycarbonate may permit molded arcuate shape or contour to cost-effectively form the panel 26.

Figure 3:
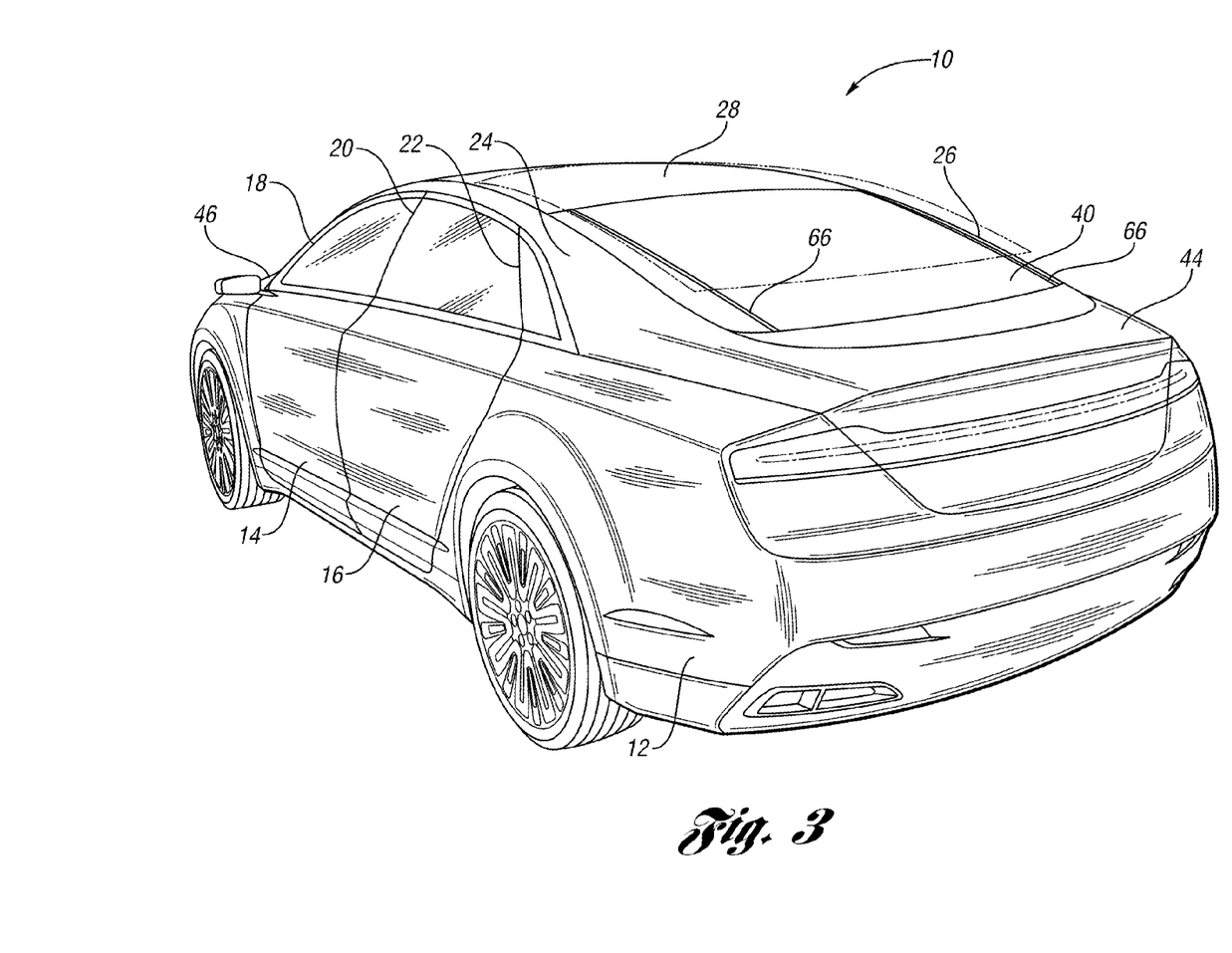
FIG. 3 is a rear perspective view of the vehicle having a panoramic roof module assembly from FIG. 1.
Figure 4:
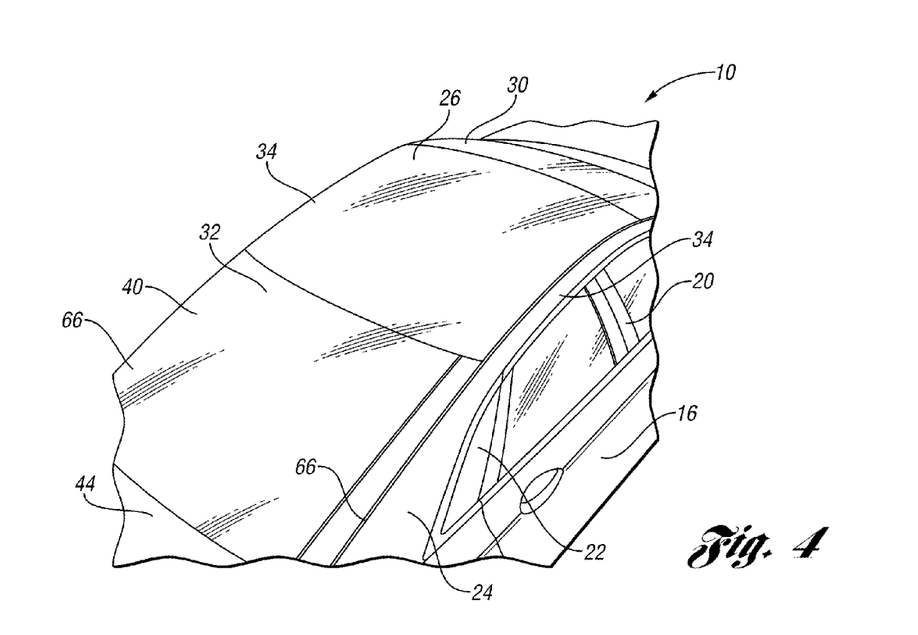
FIG. 4 is a top perspective view of the vehicle having a panoramic roof module assembly from FIG. 1, wherein the panoramic roof module illustrated in a closed position.
Figure 5:
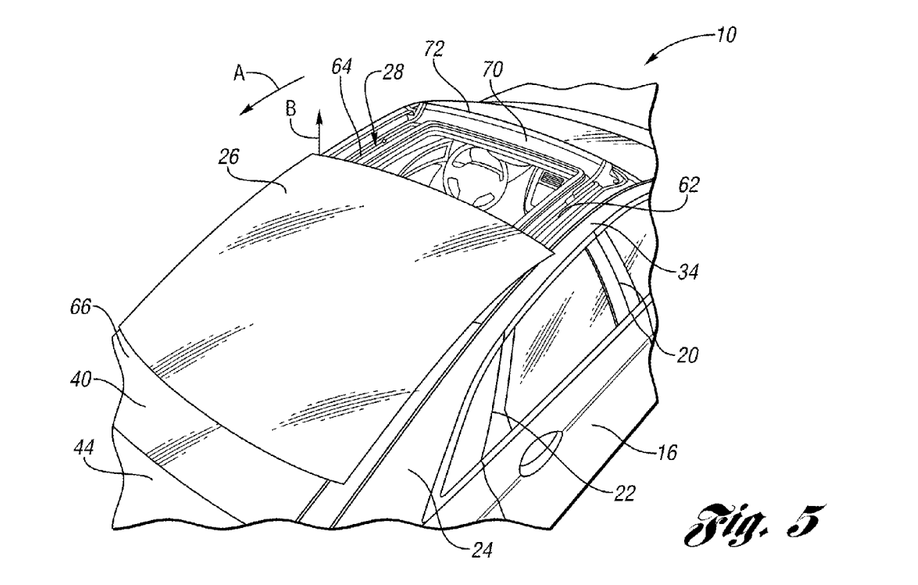
FIG. 5 is another top perspective view of the vehicle having a panoramic roof module assembly from FIG. 2, the panoramic roof module illustrated in one of the open positions.

Referring now to FIGS. 3 through 5, the panoramic roof module 28 is described more detail. The panoramic roof module 28 includes, a first side rail 62 and a second side rail 64 that extend longitudinally adjacent each of the side beams 38. Both the first side rail 62 and the second side rail 64 may be elongated along an entire upper side profile of the vehicle 10 between the front cross member 30 and the rear cross member 32. The first side rail 62 and the second side rail 64 may be mounted to the vehicle body structure 12 along the side beam portions 34.

As illustrated, both the first side rail 62 and the second side rail 64 moveably support the roof panel 26. The side rails 62, 64 may extend past the rear door 16 and C-Pillars 22. The side rails 62, 64 may extend generally parallel to the D-pillar 24 and along the rear-view window 40. The side rails 62, 64 may be formed as exposed tracks 66 adjacent the rear-view window 40 and parallel to the D-pillars 24.

The side rails, 62, 64 facilitate movement of the roof panel 26 so that a panoramic opening is created when the roof panel 26 is moved from a closed position, as seen in FIG. 4 to an opened position, as seen in FIG. 5. The side rails 62, 64 cooperate with sliding mechanisms mounted to the roof panel 26. The sliding mechanisms may be mounted to the roof panel 26 in any suitable manner. The sliding mechanisms may slide along the side rails to move the roof panel 26 in a direction indicated by arrow A. In at least one embodiment, the sliding mechanisms are connected to an electrically powered drive unit, such as a motor driven unit, by a cable to move the sliding mechanisms and roof panel 26 along the side rails 62, 64.

The panoramic roof module 28 also includes a lifting mechanism to translate the roof panel 26 in direction indicated by arrow B. When the roof panel 26 is opened, the roof panel 26 is lifted in a generally vertical direction B. Collectively, the sliding mechanisms and the lifting mechanism in the panoramic roof module 28 move the roof panel to an open position, such as the position shown in FIG. 5, without pivoting or tilting of the roof panel 26. By lifting the panel a relatively low distance and sliding the panel without pivoting, the amount of drag created by the roof panel 26 is minimized.

In at least one embodiment, each of the sliding mechanisms and the lifting mechanism may be connected to an electrically powered drive unit, such as a motor driven gear unit, by a cable to move the sliding mechanisms and roof panel 26 along the side rails 62. 64. Once the roof panel 26 is in an open position, the motor can be reversed to move the sliding mechanisms and the lifting mechanism to return to the closed position, for example. Any suitable motor or electrically powered drive gear unit can be employed within the scope of the embodiments disclosed herein.

The panoramic roof module 28 further includes a wind deflector 70. Generally, when sunroofs are open, wind noise is produced in the passenger compartment 76 of the vehicle. In addition to the broadband noise, resonant interactions between the exterior air flow and the air inside the vehicle create low frequency pressure fluctuations that produce buffeting or a throbbing noise. At critical frequencies, the buffeting or throbbing can be extremely uncomfortable to the vehicle passengers.

The wind deflector 70 is packaged along a forward portion of the panoramic roof module 28 and deploys when the roof panel 26 is moved to an open position. The wind deflector 70 extends above a roof surface 72 when the roof panel 26 is open in order to deflect the air flow away from the panoramic opening 56. In the embodiments illustrated, the deflector 72 may extend above the roof surface 72 to a height that is generally as high as or higher than a top surface of the roof panel 26 when it is an open position.

Wind deflectors generally reduce the broadband noise and also reduce buffeting of air within the vehicle by deflecting air flow away from a sunroof opening. However, in order to effectively reduce the noise and buffeting at higher speeds for a larger panoramic opening 56, as shown in FIG. 2, a wind deflector would be required to extend above the roof surface a significant distance. A large wind deflector may be difficult to package and may be undesirable for aesthetic reasons.

Figure 6:
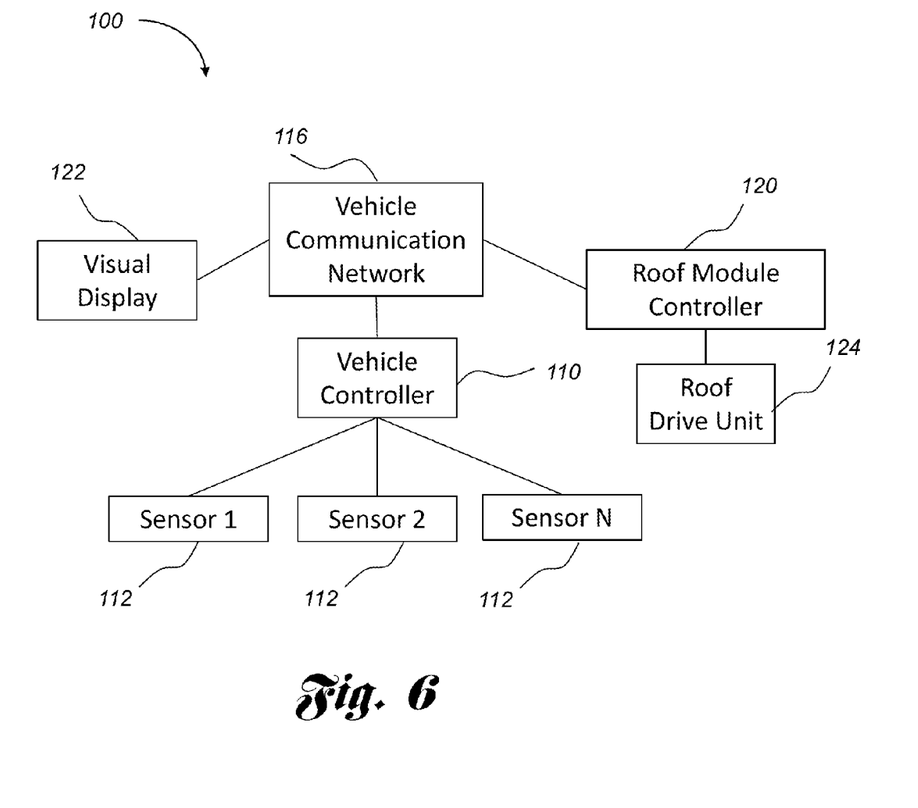
FIG. 6 is a schematic illustration of a panoramic roof module control system provided on a vehicle.

In order to reduce been noise and prevent buffeting, the panoramic roof module 28 may move to different open positions based on the vehicle speed. FIG. 6 illustrates a panoramic roof control system 100 provided on a vehicle 10. The panoramic roof control system 100 may control the open position of the vehicle 10 based on the vehicle speed, or other environmental factors.

As shown, the panoramic roof control system 100 includes a vehicle controller 110 or microprocessor that is operable to process instructions to and from various components of the panoramic roof control system 100. This microprocessor 110 could be a dedicated processor or the panoramic roof control system 100 could share a controller with other vehicle-based systems.

The panoramic roof control system 100 may also be provided with one or more vehicle-based sensors 112. For example, the sensors 112 may include vehicle speed sensors, wind speed sensors, environmental sensors or any other suitable sensors. For example, a wind speed sensor 112 may detect the resulting wind speed based on the vehicle speed in combination with any ambient wind.

The microprocessor 110 may be in communication with a vehicle network 116. The vehicle network 116 continuously broadcasts data and information to the vehicle-based systems. The vehicle network 116 may be a controlled area network (CAN) bus used to pass data to and from the microprocessor 110 (or components thereof).

For example, the vehicle communication network 116 may continuously provide the vehicle speed signal or information for use by dynamic vehicle systems such as the braking system. A roof module controller 120 may also be in communication with the vehicle network 116. The roof module controller 120 may continuously access the real time vehicle information, such as vehicle speed. If the vehicle's speed is at a threshold speed above which makes wind buffeting likely or possible, the roof module controller 120 may be moved to the roof panel 26 to position to reduce the wind buffeting effects. Alternatively, a warning may be given to the driver through a visual display 122 in communication with vehicle network 116 or the microprocessor 110.

The roof module controller 120 may be in communication with a roof drive unit 124. In one embodiment, the roof drive unit 124 moves the roof panel 26 based on information from the vehicle network 116. The drive unit 124 may be a motor, as discussed previously. A motor may detect the position of the roof panel 26 based on a count of revolutions by the motor. In another embodiment, the panoramic roof control system 100 may include sensors in the panoramic roof module 28 which detect the position of the roof panel 26. However, any suitable drive unit and/or position detection mechanism may be employed for moving and detecting the position of the roof panel 26.

Figure 7:
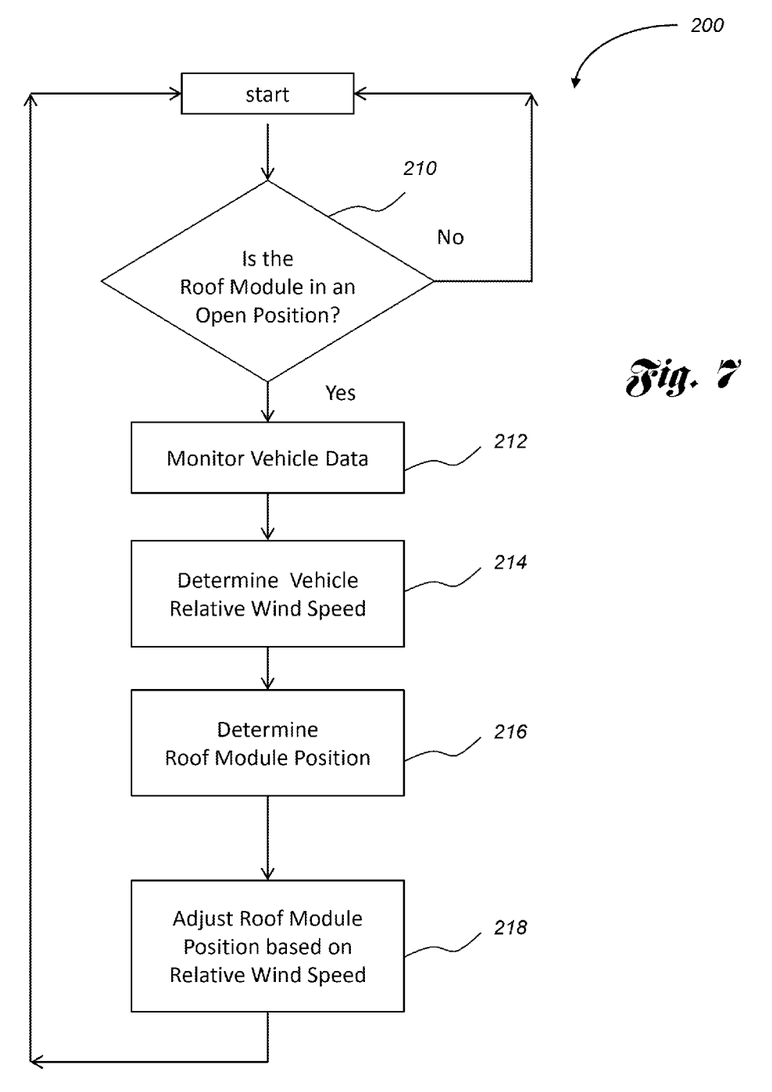
FIG. 7 illustrates a process flowchart for the panoramic roof module control system.

Turning now to FIG. 7, a process 200 for controlling the panoramic roof module 28 is illustrated. The roof module controller may control the roof module if it is in an open position, as represented by block 210. If the roof module is open, the controller monitors vehicle information from the vehicle communication network. In particular, the controller may monitor the vehicle speed.

Based on the vehicle data, the controller determines the vehicle's relative wind speed, as represented by block 214. The relative wind speed of the vehicle may be a combination of the vehicle speed and ambient wind speed. If the vehicle is not equipped to sense ambient wind speed, the controller may infer vehicle speed as relative wind speed.

Next, the controller determines the roof module position, as represented by block 216. As discussed above, the controller may count the number of rotations of the motor to determine the roof panel position. However, the controller may use other suitable methods for determining the roof panel position.

Finally, the controller may command a drive unit to adjust the roof module position based on the relative wind speed, as represented by block 218. For example, if the roof panel is in a fully open position, and the vehicle speed exceeds a threshold value, the controller may command the drive unit to move the roof panel to a second position, which decreases the opening distance of the panoramic roof module and reduces wind buffeting.

In one example, the panoramic roof module 28 may position the roof panel 26 in the fully open position 52. When the roof module controller 120 receives information that the vehicle speed is at least 65 km/h, the controller 120 moves the roof panel 26 to the second open position 56 in order to prevent wind buffeting in the passenger compartment of the vehicle 10. In another example, the controller receives information about vehicle speed and wind speed, the controller 120 may move the roof panel 26 to the second position 56 when the vehicle speed is 70 km/h and no headwind is detected.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A sunroof system comprising:
   a panel movable to define an opening;
   a lifting mechanism for translating the panel only vertically and then sliding the panel to a first position without pivoting; and
   a sunroof controller configured to receive input indicative of vehicle speed and automatically move the panel from the first position to a second position having an opening distance less than the first position when speed exceeds a threshold, to reduce wind noise.

2. The sunroof system of claim 1 further comprising a vehicle network in communication with a vehicle sensor and the sunroof controller wherein the vehicle network continuously provides a speed signal to the sunroof controller.

3. The sunroof system of claim 1 further comprising a wind deflector, wherein the panel does not extend above the wind deflector when the panel is in one of the first and second positions.

4. The sunroof system of claim 1 wherein the threshold value is based on the vehicle speed that produces buffeting in a passenger compartment at a critical noise level.

5. The sunroof system of claim 1 further comprising a sunroof actuator in communication with the controller for moving the panel between the first position and the second position.

6. The sunroof system of claim 5 wherein the actuator is adapted to determine the position of the panel.

7. A sunroof system comprising:
   a sunroof panel extending from an A-pillar to a C-pillar;
   a lifting-mechanism that only translates the sunroof panel vertically and then slides the sunroof panel without pivoting to a first position; and
   a sunroof controller configured to control sliding movement of the sunroof panel from the first position to a second open position when a relative wind speed exceeds a threshold value.

8. The sunroof system of claim 7 wherein the sunroof panel extends from the A-pillar to the C-pillar of a four-door vehicle when the sunroof panel is in a closed position.

9. The sunroof system of claim 7 wherein the second position has an opening distance less than in the panoramic position.

10. The sunroof system of claim 7 further comprising at least one vehicle sensor in communication with the controller for providing a vehicle speed signal to the controller.

11. The sunroof system of claim 10 further comprising a vehicle communication network having a CAN bus for providing the vehicle speed signal to the controller.

12. The sunroof system of claim 11 wherein the relative wind speed is based on a vehicle speed.

13. The sunroof system of claim 7 wherein the threshold value is based on the relative wind speed that produces buffeting in the passenger compartment at a critical noise level.

14. The sunroof system of claim 7 wherein the second position has an opening distance of at least 430 millimeters.

15. The sunroof system of claim 7 wherein in the first panoramic position, the panel overlaps a driver's field of vision through a rear-view window.

16. The sunroof system of claim 7 further comprising a sunroof panel actuator in communication with the controller for moving the panel between the panoramic position and the second position.

17. The sunroof system of claim 16 wherein the actuator is adapted to determine a position of the panel.

18. A method for controlling a panoramic sunroof system, the method comprising:
   translating a roof panel only in a vertical direction
   then sliding the roof panel to a first panoramic open position without pivoting to expose a sunroof opening;
   adjusting the roof panel from the first panoramic open position to a second open position if a relative wind speed exceeds a threshold value.

19. The method of claim 18 further comprising:
   receiving a wind speed signal from a CAN bus; and
   commanding a sunroof actuator to move the roof panel to the second position based on the wind speed signal.

20. The method of claim 18 further comprising basing the relative wind speed on a vehicle speed.

* * * * *